Patented May 17, 1949

2,470,515

UNITED STATES PATENT OFFICE 2,470,515

PLASTICIZED PROLAMINES

Latimer D. Myers and J. D. Fitzpatrick, Cincinnati, Ohio, assignors to Emery Industries, Inc., Cincinnati, Ohio, a corporation of Ohio No Drawing. Application July 5, 1946, Serial No. 681,598

5 Claims. (Cl. 106—153)

This invention relates to plasticizers for the prolamines of which a representative example is zein. The principal object of this invention is to provide an inexpensive and easily prepared plasticizer for these materials.

The prolamines are known as the alcohol soluble proteins. In general the prolamines are characterized by insolubility in water, in absolute alcohol, and in other neutral solvents; but they are soluble in relatively strong aqueous alcohols of, for example, 70 per cent to 80 per cent concentration. The common prolamines are obtained from seeds of the cereal grains, and are designated zein from corn, gliadin from wheat, and hordein from barley. The prolamines usually occur in grains in the gluten and can be extracted therefrom by an aqueous alcohol solvent. Certain other substances, for example, the alcohol soluble protein found in milk, are sometimes spoken of as "prolamines." However, the milk protein has somewhat different characteristics and it is to be understood that by "prolamines" is meant specifically the prolamines derived from cereals and such other alcohol-soluble proteins as have similar behavior.

Zein is an alcohol soluble protein derived from the corn germ and, as produced commercially, is a light yellow, fluffy powder which has the property of forming tough resins when mixed with formaldehyde and cured under heat and pressure. It can be molded into solid objects having high tensile strength. Sheets of a tough rubber-like material can be produced, which find usage in producing gaskets, seals, and shoe soles. Zein also may be used for coating and impregnating cloth and paper.

While zein is somewhat similar to resins formed from casein, formaldehyde does not act upon zein immediately, which enables zein products to be handled with somewhat less care than casein resins. Moreover, properly cured zein has much greater water resistance and higher tensile strength than casein resins.

In producing and fabricating zein, plasticizers are desirable not only for the purpose of imparting soft or elastic properties to the final products but also for the purpose of enabling mixtures of formaldehyde and zein to be worked more readily. In the copending application of Latimer D. Myers, (a co-applicant in this application) Serial No. 476,846, filed February 23, 1943, issued on May 13, 1947, as U. S. Patent No. 2,420,381, there is disclosed the use of the half esters of monohydric alcohols and dicarboxylic acids as plasticizers for zein. These substances are satisfactory plasticizers but are costly and difficult to manufacture because of the number of steps required to produce a plasticizer.

In our co-pending application Serial No. 560,198, filed October 24, 1944, there is disclosed a method of producing carboxylic aliphatic nitriles. In this disclosure is shown the disruptive oxidation of unsaturated aliphatic nitriles, such as oleonitrile, to break the double bond and produce a mixture containing a short chain fatty acid and a carboxylic aliphatic nitrile. Thus, the oxidation of oleonitrile is carried out to produce pelargonic acid and 8-cyano-octanoic acid (the half nitrile of azelaic acid). In accordance with the method of our co-pending application, unsaturated glycerides or acids are first converted into corresponding nitriles by any of the well known methods. For example, oleic nitrile can be formed by converting oleic acid into the methyl ester by simple esterification, then passing the methyl oleate with ammonia gas over aluminum oxide at a temperature of 490–500° C. This method is described in Bulletin de la Societe Chemique de France, 27,226–9 (1920). The nitrile so produced is then oxidized by a powerful re-agent which is capable of splitting the aliphatic chain at the point of unsaturation, but which is not adapted to attack the nitrile group at least under the conditions under which the re-agent is used. A preferred oxidizing agent is a mixture of chromic acid, sulfuric acid, and water. Other oxidizing agents such as potassium permanganate may be employed, but the use of the chromic acid oxidizing agent indicated has been found to provide very excellent yields.

We have determined that products of oxidation of an unsaturated fatty acid, where in the acidity of the carboxy group has been blocked either by conversion to an ester or to a nitrile are excellent yet inexpensive plasticizers for zein. The mixed oxidation products are used without any separation or purification process. The mixed products may be treated with bleaching agents or run through separation operations to remove by-products of the oxidation according to the common methods. However, they are preferably employed without separation into their various constituents, and in this manner costly and tedious separation steps are avoided and excellent plasticizers for zein are produced easily and at low cost.

Particularly we have found that the mixed oxidation products of unsaturated fatty acid nitriles as well as the products of oxidation of certain monohydric alcohol esters of unsaturated fatty acids are good plasticizers for zein. In the case of the oxidation product from an ester it is usually necessary to separate by solvents or other suitable means any unreacted original esters or partially oxidized esters (so called by-product esters) from the lower molecular weight cleavage products, as it is the latter bodies which possess the desirable plasticizers properties. No other separations are necessary, however, and even this step is not necessary in the case of the nitrile oxidation product.

In the products of this invention one encounters a mixture of cleavage materials of the original unsaturated fatty compound consisting of low molecular weight fatty acids such as pelargonic acid, itself a plasticizer for zein, and either the half nitrile of a dibasic acid or the half ester of a dibasic acid. Each of the components is itself an excellent plasticizer, and the mixtures are additionally excellent plasticizers; and, because of the elimination of the steps of separating the components, the mixtures are much less expensive than are the individual components.

The amount of plasticizer used in accordance with the present invention may vary anywhere between 5 and 50 per cent more or less, the exact quantities, of course, being related to the degree of softness or plasticity desired and also to curing time and temperature. Fillers and pigments such as iron oxide and carbon black may be used in conjunction with the plasticizer as desired, and it is to be noted that the plasticizers of the present invention may be used in conjunction with conventional plasticizers when special properties are to be obtained.

Our preferred method for making the plasticizers of this invention is to treat an unsaturated nitrile or ester with a mixture of chromic acid and sulphuric acid for a sufficient time to oxidize the double bond. Chromic acid is a desirable oxidizing agent to use because a spent chromic acid solution can be regenerated electrically by a simple process. However, other oxidizing agents, for example, potassium permanganate, can be used.

The following examples are given to illustrate the invention and to permit its practice by those skilled in the art but are not intended to limit the scope of the invention except as pointed out in the claims. All parts are by weight.

*Example 1*

500 parts of oleonitrile (a crude oleonitrile having 0.4 per cent free fatty acid and an iodine value of 95.7) were oxidized with a solution consisting of 760 parts chromic acid, 1900 parts concentrated sulphuric acid and 3040 parts water. The solution was divided into three parts and the nitrile treated with each part separately, the spent solution being drawn off after each treatment. The solution was added to the nitrile slowly with constant mechanical agitation and the temperature was maintained at 80° to 90° centigrade. The product was treated with 2 per cent by weight of concentrated sulphuric acid to free it of green color and then was water washed and dried to give 563 parts of an oily material with an iodine value of 0.5. The oxidized mixture consists of pelargonic acid, by-product acids, unreacted nitriles, including any saturated nitriles which may have been present in the original oleic nitrile, and 8-cyano-octanoic acid, the half nitrile of azelaic acid.

50 parts of this oxidation product was mixed with 50 parts of unplasticized zein and heated on a steam bath at a temperature of 90° centigrade for one half hour. A homogeneous, rubber-like material was formed having good tensile strength suitable for curing and molding or other use.

The esters of unsaturated fatty acids can similarly be oxidized disruptively to break the double bond and produce a mixture containing a short chain fatty acid and a half ester of a dicarboxylic acid. Thus, the oxidation of n-propyl oleate yields pelargonic acid and the half n-propyl ester of azelaic acid. The mixed oxidation product of the ester may contain sufficient by-products or unoxidized neutral esters to be partially incompatible with zein. However, a simple purification step by solvent separation using an aqueous-alcohol solvent or the like or other appropriate separation methods suffices to separate the acids from neutral by-products.

*Example 2*

200 parts of n-propyl oleate were oxidized with a solution containing 257 parts of chromic acid (56% excess of theoretical) in a solution having the same ratios of ingredients as the oxidizing solution of Example 1. The oxidizing solution was divided into three parts and the n-propyl oleate was treated with each part separately, spent solution being drawn off after each treatment. The oxidizing solution was added slowly with constant mechanical agitation, and the temperature was maintained at 80° to 90° centigrade. The product was treated with 2 per cent by weight of concentrated sulphuric acid to free it of green color and then was water washed and dried to give a light colored oil with an iodine value of 1.9.

100 parts of this intermediate product were mixed with 200 parts of methanol and 100 parts of water and shaken vigorously. The mixture was allowed to separate at room temperature to form an oily lower layer under an alcoholic aqueous solution. The layers were separated and the alcohol and water were evaporated from from the upper layer to give a finished plasticizer.

50 parts of this plasticizer and 50 parts of zein were heated together on a steam bath at a temperature of approximately 90° centigrade for ½ hour. A light yellow, homogeneous, rubber-like material was formed suitable for curing.

For the ester from which the plasticizers of this invention are made, the propyl and butyl esters are preferred. Methyl and ethyl esters may be employed but are less desirable because of their tendency to hydrolyze rapidly during oxidation when a chromic acid oxidizing solution is employed. In addition, esters of other monohydric alcohols containing from 1 to 12 carbon atoms may be employed to advantage.

The plasticizers of this invention are satisfactory for use in the common types of zein and are much less expensive than the other types of plasticizers formerly used. A notable advantage of these plasticizers is that their manufacture is a simple, one stage, oxidation operation which utilizes readily available materials and requires no steps of separation of organic materials one from another to produce a satisfactory final product. All the major constituents of our plasticizer, if used singly, act as plasticizers; but, by the use of a mixture of unseparated oxidation products the expense of separation steps necessary to produce pure compounds is avoided.

Oleic acid is the commonest unsaturated fatty acid and the nitrile and esters of oleic acid, are the preferred sources of our plasticizers. However, the nitriles and esters of other unsaturated fatty acids, for example the nitriles of the 18 carbon linoleic and linolenic acids and also the nitriles and esters of the unsaturated acids present in fish oil fatty acids, which have 20 to 22 carbon atoms to the molecule, may also be oxidized to produce plasticizers for the prolamines in accordance with this invention. If the nitrile or esters of an acid having more than one point of unsaturation is to be used, the acid portion is preferably partially hydrogenated in the manner disclosed in our copending application S. N. 475,281, now abandoned, before oxidation, in order to provide a mono unsaturated nitrile or ester. Partial hydrogenation prior to oxidation is desirable with polyunsaturated material to avoid the use of an undue amount of the oxidizing agent, for any material between two double bonds is normally oxidized to form carbon dioxide and water; and, thus, the oxidation of polyunsaturated material without prior partial hydrogenation would consume a large amount of the oxidizing agent merely to form by-products.

Having described our invention, we claim:

1. A composition of matter consisting essentially of zein plasticized with mixed products resulting from the heating of a higher unsaturated aliphatic nitrile with a chromic acid oxidizing solution for a sufficient time to cause cleavage of the double bond of a substantial portion of the unsaturated nitrile, the said mixed product being present in the zein in quantity sufficient to plasticize said composition.

2. A composition of matter consisting essentially of a prolamine plasticized with mixed products resulting from the heating of a higher unsaturated aliphatic nitrile with a chromic acid oxidizing solution for a sufficient time to cause cleavage of the double bond of a substantial portion of the unsaturated nitrile, the said mixed product being present in the prolamine in quantity sufficient to plasticize said composition.

3. A composition of matter consisting essentially of a prolamine plasticized with mixed products resulting from the heating of oleic acid nitrile with a chromic acid oxidizing solution for a sufficient time to cause cleavage of the double bond of a substantial portion of the oleic acid nitrile, the said mixed products being present in the prolamine in quantity sufficient to plasticize said composition.

4. A composition of matter consisting essentially of a zein plasticized with mixed products resulting from the heating of a higher unsaturated aliphatic nitrile with a chromic acid oxidizing solution for a sufficient time to cause cleavage of the double bond of a substantial portion of the unsaturated nitrile, said mixed products constituting substantially 5 to 50% by weight of said composition.

5. A composition of matter consisting essentially of zein plasticized with mixed products resulting from the heating of oleic acid nitrile with a chromic acid oxidizing solution for a sufficient time to cause cleavage of the double bond of a substantial proportion of the oleic acid nitrile, the said mixed product constituting from substantially 5 to 50% by weight of said composition.

LATIMER D. MYERS.
J. D. FITZPATRICK.

REFERENCES CITED

The following references are of record in the file of this patent:

UNITED STATES PATENTS

| Number | Name | Date |
| --- | --- | --- |
| 2,292,950 | Loder et al. | Aug. 11, 1942 |
| 2,369,108 | Myers et al. | Feb. 6, 1945 |
| 2,420,381 | Myers | May 13, 1947 |